(12) United States Patent
Müller et al.

(10) Patent No.: US 8,341,714 B2
(45) Date of Patent: Dec. 25, 2012

(54) SECURITY TOKEN AND METHOD FOR AUTHENTICATION OF A USER WITH THE SECURITY TOKEN

(75) Inventors: Lorenz Müller, Biel (CH); Marcel Jacomet, Lengnau (CH); Roger Cattin-Liebl, Grenchen (CH); Alain Rollier, Steinen (CH)

(73) Assignee: AXSionics AG, Biel (CH)

( * ) Notice: Subject to any disclaimer, the term of this patent is extended or adjusted under 35 U.S.C. 154(b) by 935 days.

(21) Appl. No.: 12/159,470

(22) PCT Filed: Dec. 20, 2006

(86) PCT No.: PCT/CH2006/000715
§ 371 (c)(1),
(2), (4) Date: Oct. 7, 2008

(87) PCT Pub. No.: WO2007/073609
PCT Pub. Date: Jul. 5, 2007

(65) Prior Publication Data
US 2009/0320118 A1    Dec. 24, 2009

(30) Foreign Application Priority Data

Dec. 29, 2005    (EP) .................................... 05113081

(51) Int. Cl.
*G06F 7/04* (2006.01)
(52) U.S. Cl. ................ 726/9; 726/20; 380/229; 705/65; 705/66; 705/67; 705/68; 705/69; 713/172; 713/173; 713/174
(58) Field of Classification Search ................ 726/9, 20; 380/229; 705/65, 66, 67, 68, 69; 713/172, 713/173, 174
See application file for complete search history.

(56) References Cited

U.S. PATENT DOCUMENTS

| | | | | |
|---|---|---|---|---|
| 5,784,463 | A | * | 7/1998 | Chen et al. ..................... 713/171 |
| 7,108,177 | B2 | * | 9/2006 | Brookner ........................ 235/382 |
| 2002/0034301 | A1 | * | 3/2002 | Andersson .................... 380/270 |
| 2006/0136717 | A1 | * | 6/2006 | Buer et al. ..................... 713/155 |

FOREIGN PATENT DOCUMENTS

| | | |
|---|---|---|
| EP | 1480107 | 11/2004 |
| WO | 02/15626 | 2/2002 |
| WO | 2004/036467 | 4/2004 |

OTHER PUBLICATIONS

Jakob E. Bardram; Context-Aware User Authentication—Supporting Proximity-Based Login in Pervasive Computing; Year: 2003; pp. 1-18.*

* cited by examiner

*Primary Examiner* — April Shan
(74) *Attorney, Agent, or Firm* — The Webb Law Firm (57) ABSTRACT

A security token includes (a) a personal data memory configured to store digital identity credentials related to personal data of a user; (b) an input appliance configured to check said personal data; (c) a key record data memory configured to store at least one identity credential of an authentication server or of an application operator; (d) a transmitter and receiver unit configured to create a secure channel directly or indirectly to said authentication server or application operator to handle said key record relating to said authentication server or application operator, respectively; (e) a control unit configured to control the transmitter and receiver unit and the key record data memory in view of said handling, wherein the control unit is configured to perform one of: interpreting, deciphering, creating, checking, renewing, withdrawing and further key record handling actions. A method for authentication of a user using the security token is also disclosed.

8 Claims, 9 Drawing Sheets

SECURITY TOKEN AND METHOD FOR AUTHENTICATION OF A USER WITH THE SECURITY TOKEN

BACKGROUND OF THE INVENTION

1. Field of the Invention

The invention relates to a method and a device to authenticate a user, to give access to a system that is secured and to facilitate the management of personal digital identities.

2. Description of Related Art

There are several devices and methods to authenticate the user to a system, which may be a building system, or to a computer network, or to a remote information system. The aim of authentication may be physical access to a building, e.g. to open a door, or logical access to a webservice, e.g. access to a web page or for information retrieval, e.g. from a remote computer system.

Thereby the user uses generally his name which is also designated as a user ID in combination with the password or a PIN-Code. After successful authentication the user has access to a computer network or to said system. The weakest link in a secure system is generally the user. This is due to the fact that the user is usually negligent in view of choosing strong passwords. Additionally passwords are often not treated as highly valuable secrets. Furthermore the user may also be a target for social engineering attacks like phishing, where user names and corresponding passwords are stolen or snatched by third parties.

A typical user of computer systems and Internet services would have to memorize and manage over 50 UserIDs, passwords and PIN-codes, all this information has to be treated as real secrets as it is supposed by most of today's authentication systems. It is a well-known fact that users don't handle such identity credentials as valuable secrets. Users choose either simple passwords or simple rules to memorize passwords. Dictionary attacks can break such alleged password secrets within seconds. To augment the authentication security operators distribute passive or active tokens (cards, OTP-lists, time dependant pass code generators, digital certificates etc). The handling of all these physical and virtual identity credentials makes life not easier for their owner. Many internet services are just not used any more because users forgot how to access the site. Users restrict their business relations to fewer operators which naturally reduces the business opportunities for e-commerce. While many systems offer identity management functions for operators the problem of the user side identity management remains unsolved.

The purpose of an authentication at a physical gate or a virtual portal is the same. The access to a restricted site should be limited to authorized persons. Only the security policy should define what identity credentials are acceptable for a specific access control. In the real world however many organizations run different and more or less separated access control systems with independent identity credentials for physical (access to buildings and sites etc) and logical access (access to computer systems and information etc). This inconsistency creates administrative overhead, complications for the users and last but not least a security flaw.

Since a number of years Federated identity management (FIM) and Single-sign-on (SSO) systems or enterprise-reduced-sign-on systems are suggested to reduce this burden of multiple authentication for the user. This is correct, however, the main problem of such FIM systems is the necessity that the different firms or service provider have to coordinate their work and accept each other the common users. This is not workable. These efforts are—in the end—ineffective to solve this problem.

WO 02/15626 relates to a mobile phone usable as authentication device, wherein the user authenticates himself with the mobile phone in one or more ways including biometric characteristics and then the mobile phone authenticates itself with the requested service. WO 02/15626 strives to obviate the transmittal of a token from the user to the device, wherein one authentication can be used as long as all authentication service provider use the same protocols.

SUMMARY OF THE INVENTION

An object of the present invention is to provide a method and a device, which allows a user authentication that is more secure than using methods of prior art.

It is a further object of the present invention to optimize the user-operator relation in terms of efficiency and security.

It is a still further object to provide a simpler and more ergonomic method and device to grant access to a secured system.

It is still a further object to provide the user with a personal identity management system (PIMS) that administers his digital identities and identity credentials with a minimum of user interaction.

It is still a further object to provide a user with a modular PIMS which can be customized at any time with an additional token that contains information for a new authentication or service delivery process.

According to the invention there is provided a security token comprising a personal data memory to store personal and personalized data of the user as digital identity credentials, an input appliance to allow checking of said personal or personalized data, a key record data memory to store identity credentials of an authentication server or application operator, a transmitter and receiver unit for creating a secure channel directly or indirectly to said authentication server or application operator to handle said key record relating to said authentication server or application operator, a control unit to control the transmitter and receiver unit as well as the key record data memory in view of said handling, comprising an action from the group of interpreting, deciphering, creating, checking, renewing, withdrawing and further key record handling actions. It may optionally be equipped with a fixation mechanism which allows the connection to an additional token with customization information (see below). It preferably further comprises a power supply unit and a protected channel for firmware updates.

The security token can have the form of a smart-card but can also be a cellular phone or a PDA. It is important that personal data can be entered and stored. Such personal data can be a secret or biometric data. In order to allow authentication a key record data memory is used to store identity credentials of one or more authentication servers. These key records are "handled" after creating a secure channel directly or indirectly to said authentication server, wherein handling comprises a number of actions.

Occasionally the security token is used in combination with an additional token to perform an identity check upon creating a new key record. Such an additional token can be a one-time-password, to perform an authentication check of property of said password, or comprise an electronic circuit element with additional transmitter and receiver means to create an additional secure channel to the security token. This enables the entire device to receive a message payload from the authentication server which is processed and forwarded to said control unit, to handle the relevant key record. This option makes the device modular and customizable for the delivery of new authentication services which are not yet known at the time of the delivery to the user.

In a preferred embodiment there are provided a plurality of key records, each record attributed to one certification authority or authentication service provider or operator. Several key records may be attributed by the certification authority and later be activated by different authentication service providers. This enables each certification authority to authenticate the identity of the user independently within the token, whereas the user only has this one token and additionally has control over his personal data (biometric data are only stored within the token). It is up to the different organizations to decide, how to handle the different key records by different authentication servers or application operators. The user has a very convenient way to authenticate himself with only one security token and credentials of different providers securely memorized in said token. If one of the authentication servers or application operators wants to renew and change the authorization, this can be done completely independent from the key records of other organizations.

The preferred embodiment foresees a secured USB, especially mini-USB or other physical connector that may be used for the reloading of the internal power supply equipment and for the bootstrap or renewal of the firmware. It may also be used to deliver certified information that can not be delivered over the other available channels (e.g. X509 certificate).

If some CAs have a lead on the market, it is possible to create two or more key segments comprising different key records which can be enabled and distributed by the different certification authorities to different authentication servers or application operators. Such a CA or an authentication service provider authorized by the CA may operate a portal that gives access to multiple sites and services that need an authentication of their users but that do not want to run an own authentication system.

The token and the method is of course intended to provide positive authentication of the security token to allow the user quite a number of actions, as e.g. access to a software application, to effect a payment, to create a ticket or to allow physical access, especially to open a door. Such a user side personal identity management system must always be under the control of the user and it must be protected from any outside malicious manipulation. Therefore a personal identity management system should not be implemented on data terminal equipment (PC, Mobile phone etc) that can come under control of an attacker.

The invention is based on the insight of the inventors, that the proposals used in the prior art start from the wrong side of the user-operator relation. Only a user side identity management can handle the multiple identity credentials of the user.

The invention enables the user to use federated identities in a highly secured environment, using biometric data to authenticate himself with the device and within the method used, but without giving away such biometric data to third parties.

BRIEF DESCRIPTION OF THE DRAWINGS

The drawings will be explained in greater detail by means of a description of exemplary embodiments, with reference to the following figures.

DETAILED DESCRIPTION OF THE INVENTION

Figure 1:
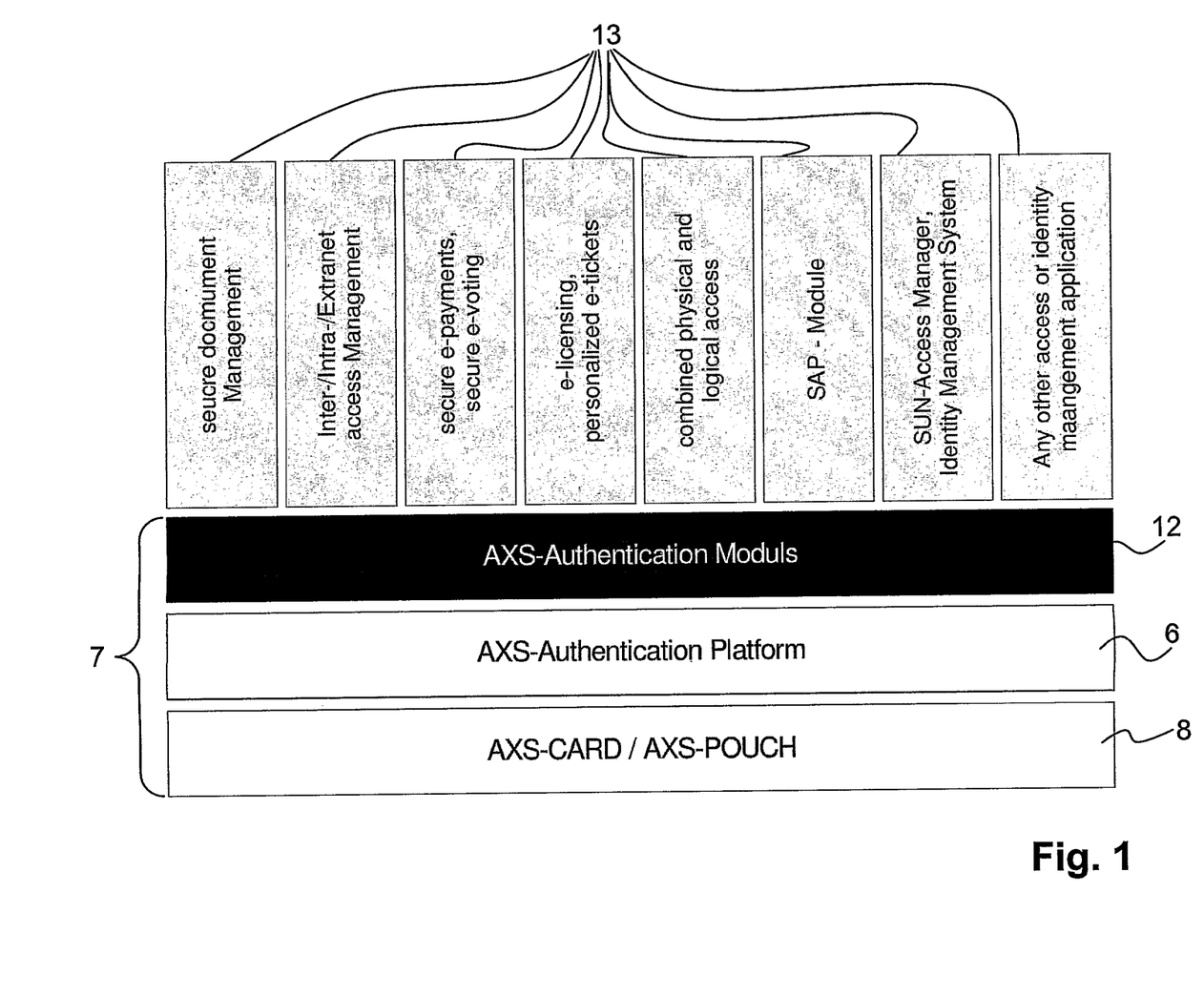
FIG. 1 shows a method and a device according to the present invention embedded in a secured environment.
Figure 2:
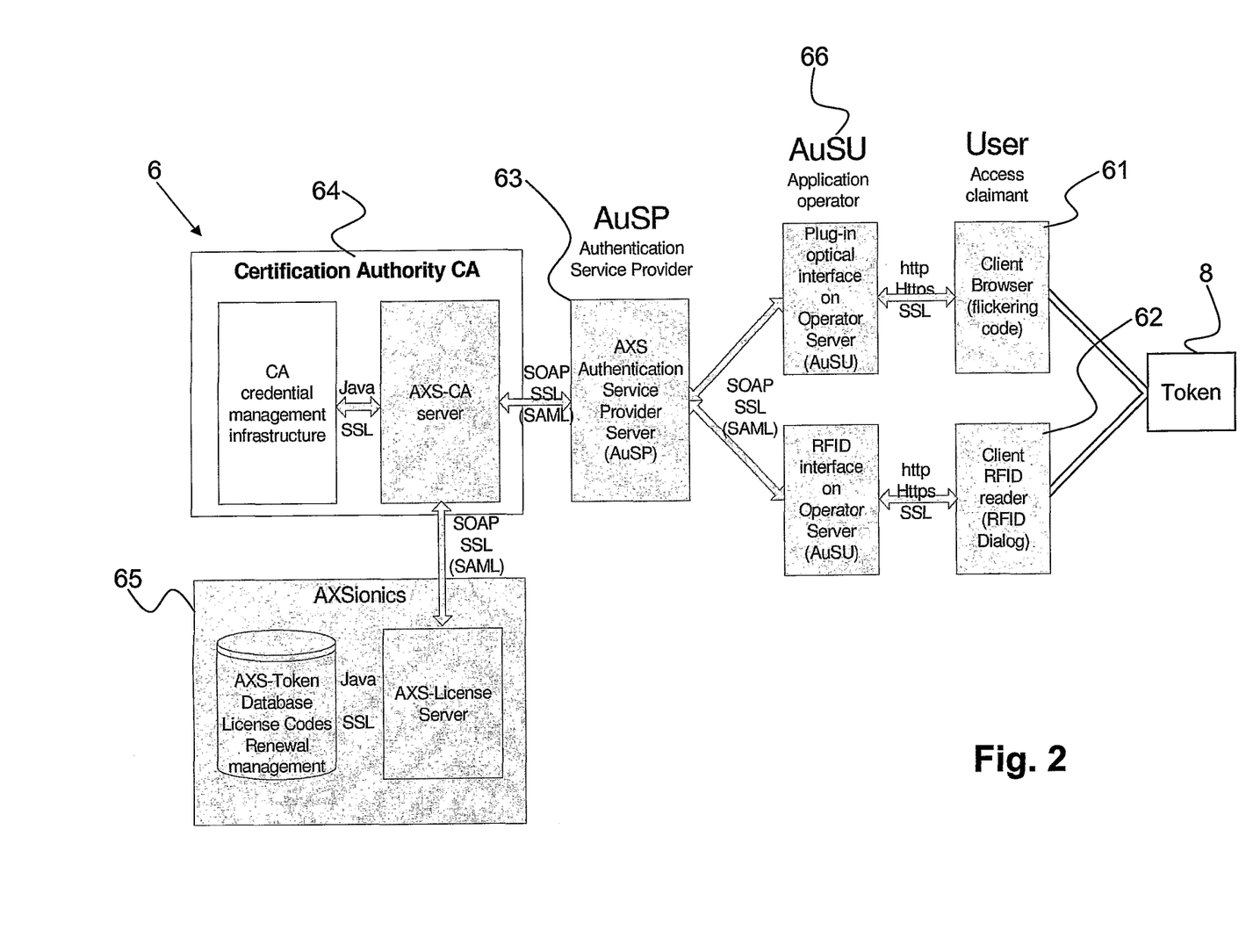
FIG. 2 shows the relevant components and the communication channels for the device of FIG. 1 and while using the method according to the invention.

FIGS. 1 and 2 show schematically a possible arrangement of the method according to one embodiment of the present invention.

Thereby FIG. 1 shows a three functional subsystem 7. The three functional subsystem 7 comprises a token 8, 9, an authentication platform 6, and authentication modules 12. The token 8, 9 is a security token and used within the context of a multifactor authentication as "something the user has". The token 8, 9 may be a smart card, a SIM-card or comprise a reader terminal for such a card. In the latter case the security token 8, 9 is then the combination of an intelligent card and the reader. A PDA or a mobile phone can therefore be considered to be such a token 8, 9. In the following description it is assumed that the security token is a card 8, 9.

The three functional subsystem 7 is responsible to control, restrict and authenticate access to subsequent secured applications 13. It is understood to the person skilled in the art that such applications 13 are not limited to the one which are shown and mentioned in FIG. 1. It is to be noted that the credentials provided by the organizations running the applications 13, can be separate (and therefore physically to be loaded into the subsystem 7) but also included in the authentication modules 12 through a software transfer into a secured memory as will be shown below.

Within the entire description, some abbreviations will be used which are defined in the enclosed list of reference numerals at the end of the description.

An example of such an authentication platform 6 is illustrated by means of FIG. 2. The authentication platform 6 comprises a license server 65, a certification authority server CA 64, an authentication service provider server AuSP 63, optical features, 61 and/or information transmitting means 62, such as radio frequency identification features (RFID). The authentication platform 6 may be built as a digital portal to enable the authentication service provider to grant access to a computer system or it may be built as a physical portal, which controls for example access to a building.

An optical feature 61 may be a plug-in applet or any other graphics generating program that generates a flickering code that is displayed on the screen of the user computer e.g. in a client browser window (e.g. as described in EP1255178) and will be read by an optical channel of the card 8, 9. As input the applet or the program gets an authentication server message with a card, segment and key record address and an encrypted message. (This message is transmitted from the authentication server to the local terminal equipment over a http-, httpsor an other secured channel protected by a suitable point-to-point protocol, e.g. SSL-protocol). During a session the operator may authenticate or verify the presence of the authorized user one or several times and link this authentication with transaction specific information that is only accessible through the token 8,9. The channel from the server to the local data terminal is additionally secured by the usual network security mechanisms (VPN, https or other SSL protected protocols).

The RFID feature 62 may be an application for the RFID server that transforms the address and the message from the authentication server into an RFID communication dialog for the reader terminal or card 8, 9. Said message will be transmitted using the same protocols as described above.

Beside these two communication ways it is also possible that the information is transmitted in an acoustic way or in a simple optic way (IR transmission), with the usual backdraws of such a slower transmission mode.

The AuSP-server 63 performs the basic authentication protocol and it generates on request of the operator server 63 the appropriate challenge-response message, encrypts it, signs it and transforms it into a SOAP message (Simple Object Access Protocol). If necessary (first and renewal registration, on-line enrolment) it communicates with the certification authority server (CA server) 64 to get the necessary keys, activation and renewal codes.

The CA server 64 allows a certification authority (CA) to initialize cards 8, 9 with their private keys and to perform the enrolment process.

Figure 4:
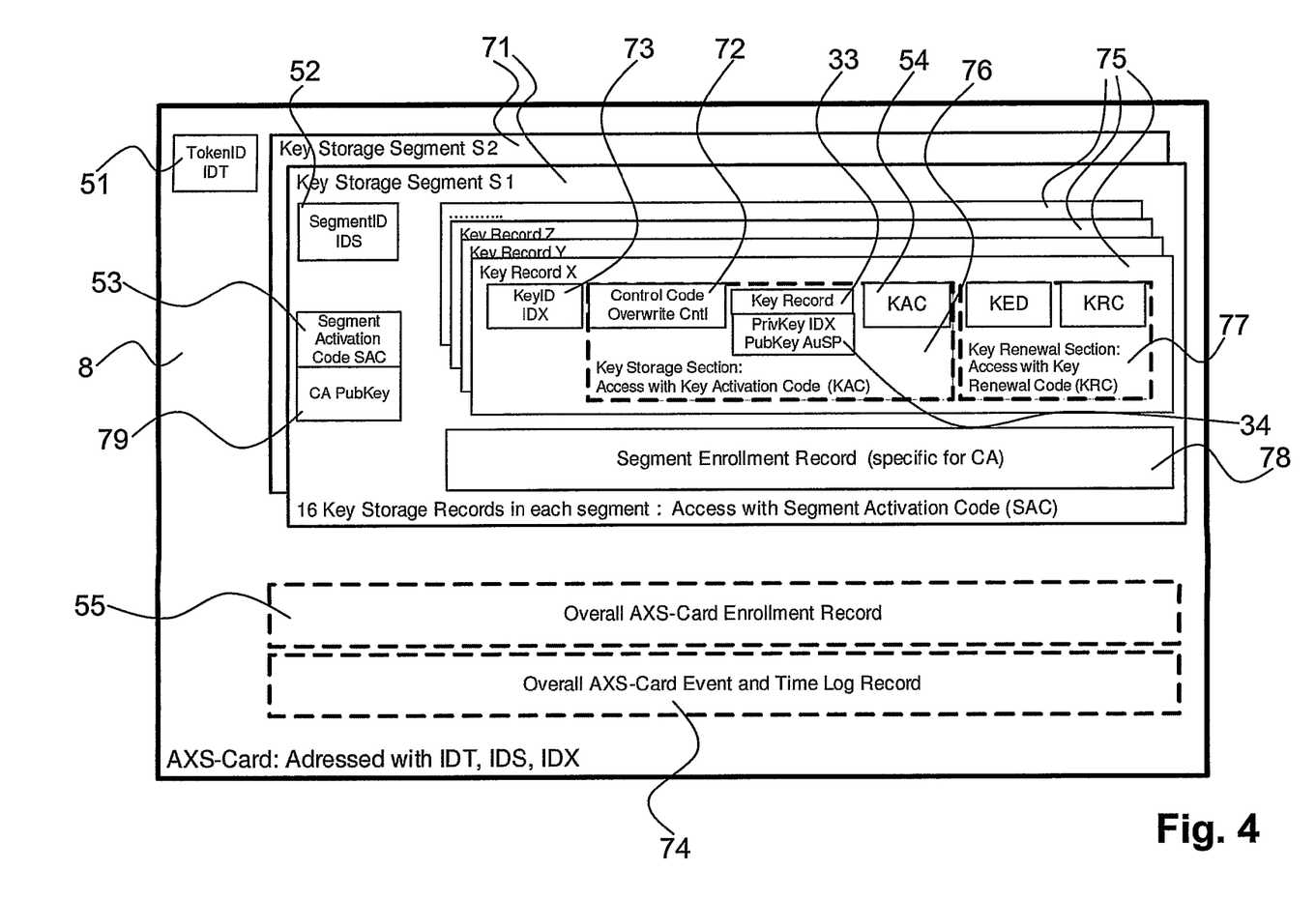
FIG. 4 shows the data architecture of a credential management within a card according to the present invention.

A license server 65 is the card management system that administrates all circulating cards 8, 9 delivers the access codes for the CA server 64 (SAC—segment activation code 53, KAC—Key Activation Code 54) and the license renewal information (KRC—Key Renewal code with a new KED—Key expiration date referenced as 77 in FIG. 4). The license control codes allow the implementation of new, flexible and modular business models with a charge for one or several authentication acts or for a limited or unlimited period (license per sale of the token 8,9).

The basic implementation of the method according to the present invention may be done for applications that are offered over the internet. The whole authentication method however can be also used for the authentication within operating systems (Windows, Solaris, Linux etc) or in applications that need user authentication (SAP, Secure Adobe, CRMs, CSMs etc). If the method according to the present invention is used for operating systems or applications, the standard login and user authentication module of said applications have to be replaced with a corresponding authentication module according to the present invention.

The device according to the present invention will be explained by means of FIGS. 3, 4, 8 and 9.

Figure 3:
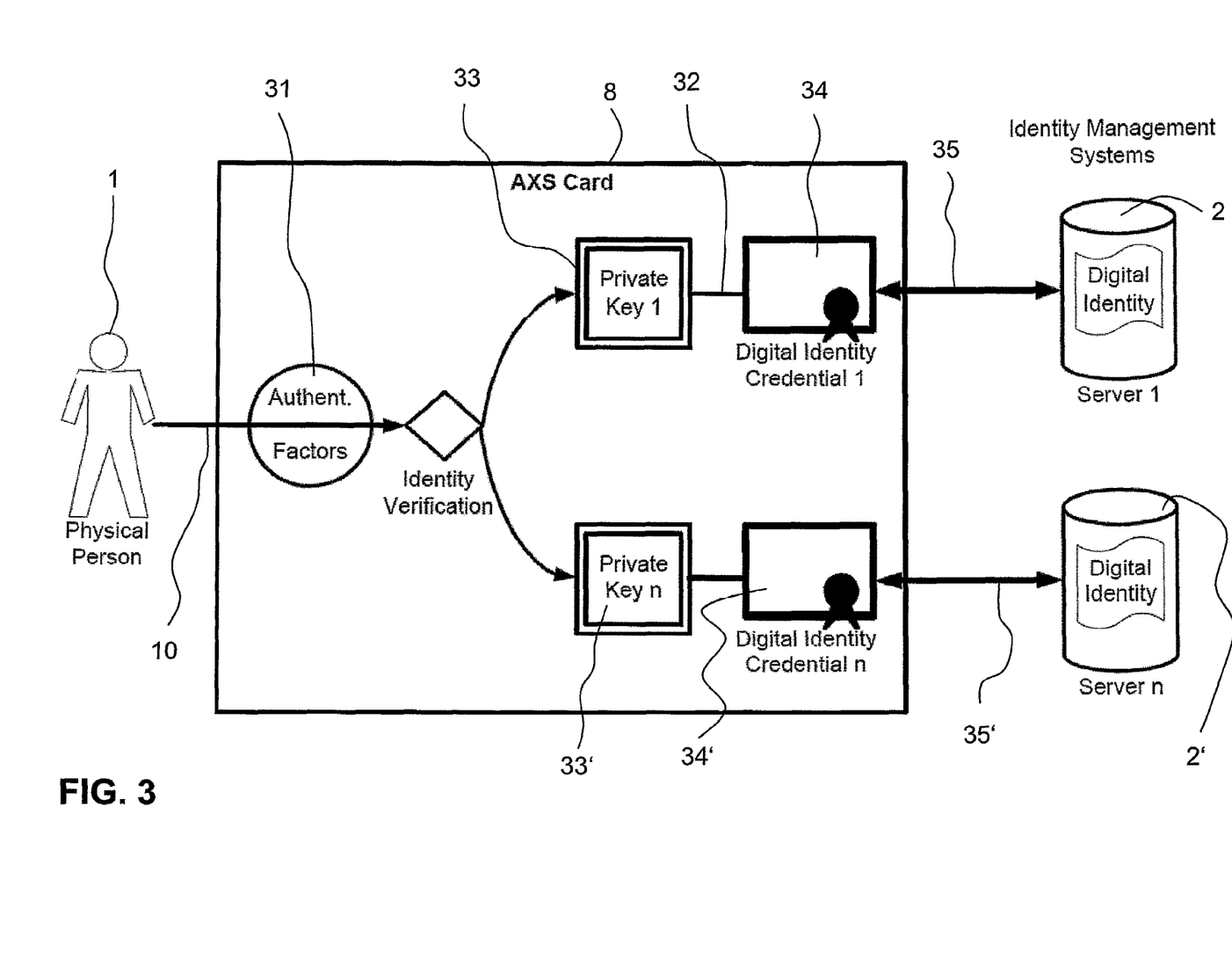
FIG. 3 shows schematically a card for use with the method and the device of FIG. 1.

A person or user 1 establishes a link to a card 8, 9 according to the method as described below. The card 8, 9 holds personal (biometric) data 31 (In a multifactor authentication this credential is "something about the user is"), personalized digital data 33 and certified digital credentials 34, 34' for the persons identity relative to a certain authentication service provider and establishes a permanent, strong and provable link 35, 35' to the AuSP servers 2, 2'. Together the personalized digital data and the certified credential 33, 34 form the essential information of the key record 75. This may be done once and forever. The digital credentials 33, 34 may be initialized and presented to an independent information management system (IMS) and their authentication servers 2, 2'. However, the credentials 33, 34, 33', 34' may also be presented to any other system as known by the person skilled in the art. FIG. 3 also shows the possibility that a plurality of different digital credentials 1 to n may be saved on the card 8 and additionally the card 8 is equipped to verify the identity of the IMS-Servers 2, 2' by the credentials 34, 34' etc. It is one advantage of the device according to FIG. 3 that the input of personal data, i.e. biometric data or a secret, is handled through connection 10 and is stored as factor 31. These entries are used, when creating the private keys 1 to n, but preferably do not necessarily comprise such data as part of the key. This has the advantage that the user remains as owner of the card 8 also physical owner over his biometric data and no distribution of these biometric data outside of the card 8 is contemplated. Therefore no abuse of such data, i.e. through hacking by third parties in a master server storing such biometric data, is possible. This is important since such biometric data cannot be replaced as it is possible with a PIN.

On one hand the card 8, 9 verifies the identity of the authorized user through a two- or three-factor authentication 7, on the other hand it processes identity credentials and digital authentication requests that may have various different forms. Such examples of such an authentication service provided by the card may be a response to a challenge-response protocol as explained in EP 1 480 107 from the same inventors, a generation of a digital signature, the delivery of a message authentication code or the activation code for a software certificate. Such a digital authentication request may comprise a challenge relating to "something the user knows". Depending on the security level one of the mentioned checks may be omitted.

Figure 5:
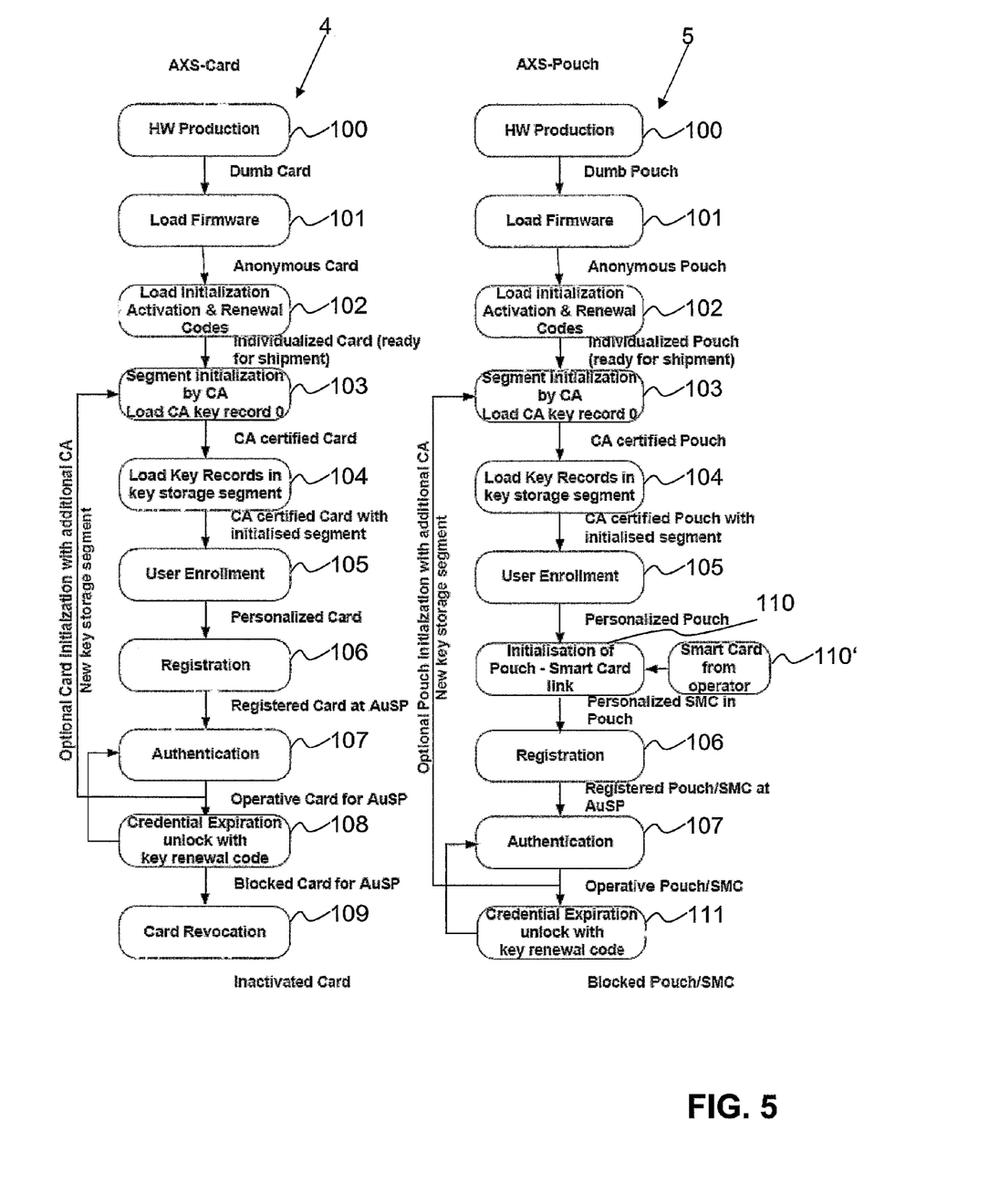
FIG. 5 shows a possible set up method according to the present invention.
Figure 6:
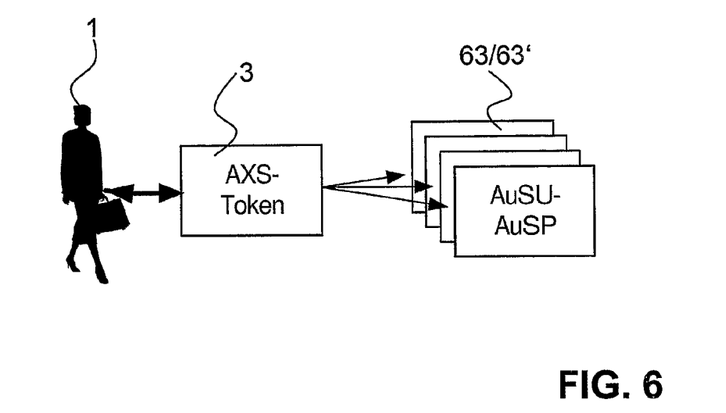
FIG. 6 shows schematically the method and device according to the present invention with a user.

The card 8 according to the present invention is preferably preloaded with a set of addresses 51, 52 and 73, keys 33, 34, 72, 79 and codes 53, 54, 76, 77 as it may be seen from an example of such a card shown in FIG. 4 and examples of manufacturing processes 4, 5 as shown in FIG. 5. The card 8 is the personal digital identity management assistant. This means that information regarding to the users identity is stored on the card 8 as well as other information that relate to other services. The information relating to the users identity is usually contained in overall data 55 together with the enrolment record 74 etc., represented by reference numeral 31 in FIG. 3. The card 8 comprises several key storage segments 71, wherein each segment can comprise a number for key records 75. This is equivalent to an internal identity credential management system that contains private keys (part of 34) in a key storage record 75 within a key storage section 71 as digital identity credentials, the corresponding public keys of the AuSP (part of 34) that uses a specific private key, the public key of the CA 79 that loaded the private keys, optional enrolment 78 and license access information. Key renewal section 77 as well as segment activation codes 53 are also contained in each segment. However, all data stored on the card are externally deliverable via a suitable interface and suitable permissions (license or CA-permissions) and/or can be updated later on through separate uploads. Therefore the structure shown in FIG. 4 shows a card in use. It is possible to attribute a first CA a segment 71 with only one record 75 and a second CA another segment 71 with e.g. five records 75. It is later on always possible to extend the allocation of records of card 8 to additional CA's (a new third CA can receive a newly created segment), or to allocate additional or delete existing records 75 for said first or second CA. The physical place of such information within the memory of the card is controlled by identity numbers as IDT 51 for the token, IDS 52 for a segment and IDX 73 for a key record.

Figure 8:
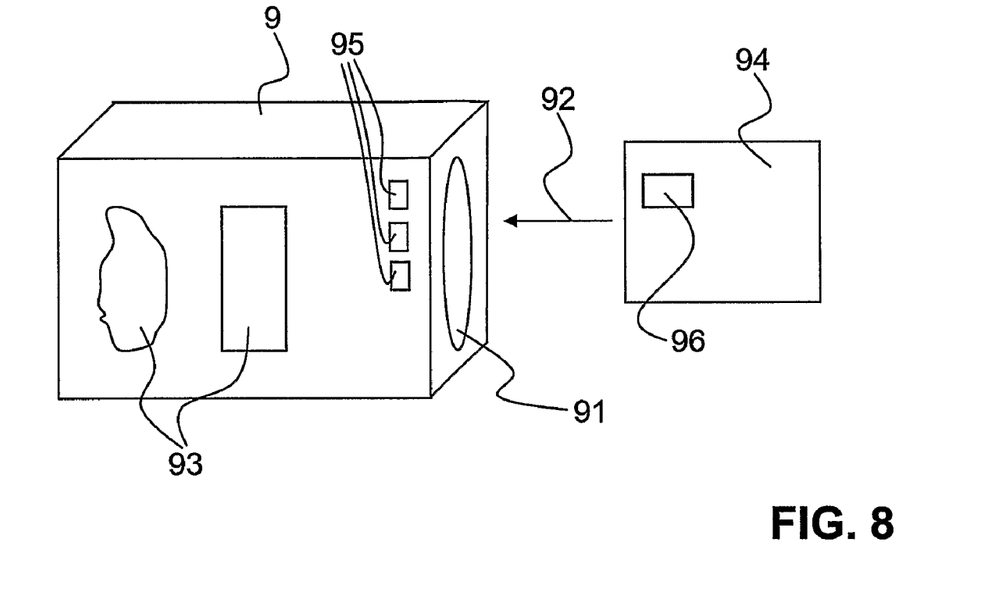
FIG. 8 shows schematically a card according to the present invention.

FIG. 8 shows a first embodiment of such a card 8 according to the present invention. The card 8 has a similar size as a usual credit card, but is typically thicker than a credit card, usually twice to thrice (the representation within FIGS. 8 and 9 is exaggerated). Personal information 83 is stored on the card by storage means. Storage means may be a simple picture, a barcode, a radio frequency chip or any other suitable mean. Additionally the card 8 comprises a reception pocket to receive an additional chip card 84 which may be inserted and removed as indicated by arrow 82. The additional chip card 84 may be a chip card analog to a SIM Card that may be inserted in the card 8. The chip card 84 may also be designated as additional token. Several different chip cards may be edited by different CA's, AuSP's and operators.

Figure 7:
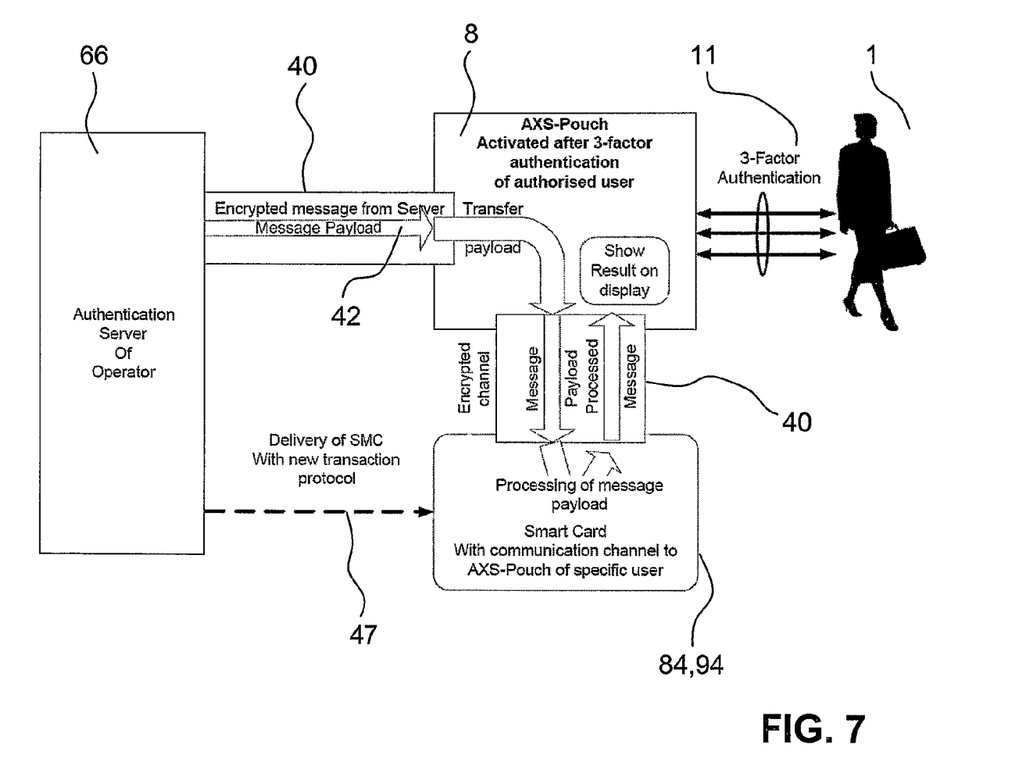
FIG. 7 shows the interaction of the card with a smart card according to the present invention in combination.

Besides physically adding the additional security token it is also possible to upload said information into a memory as will be seen in the description relating to FIG. 7. An AuSP or an operator may accept such upload as sufficient for access to his services or request the presence of a physical token 84 or 94 within the card 8 or 9.

Figure 9:
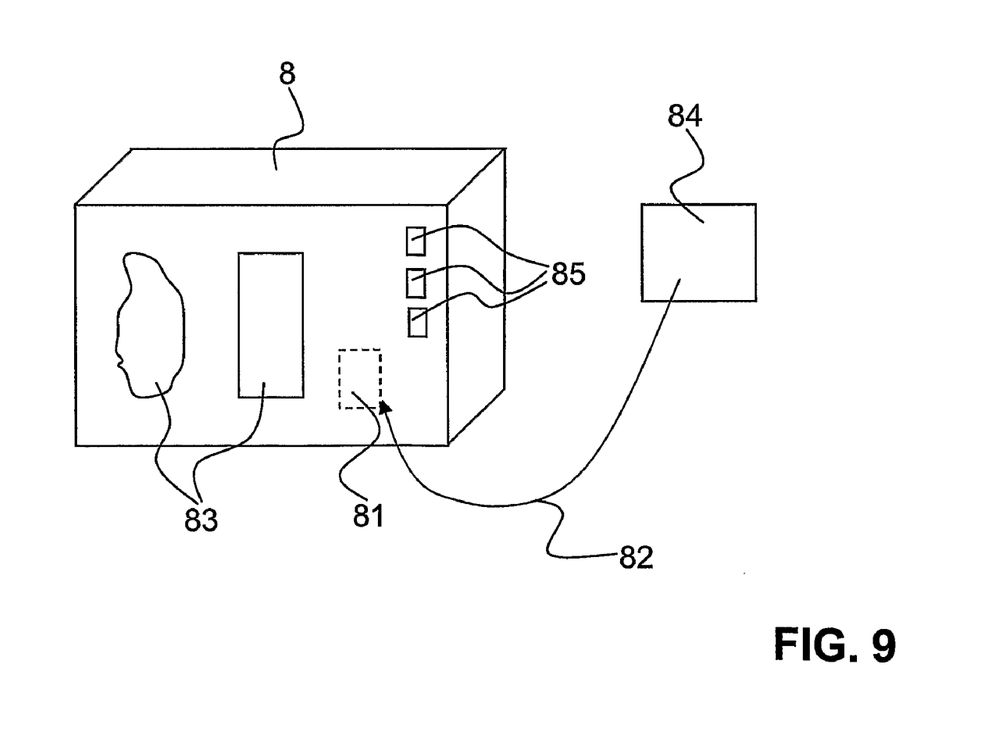
FIG. 9 shows schematically a pouch according to the present invention.

FIG. 9 shows a second embodiment of a pouch 9 according to the present invention. The pouch 9 has also a similar size as the card 8 in the first embodiment. Personal information 83 is stored on the pouch by storage means. Storage means may be a simple picture, a barcode, a radio frequency chip or any other suitable means. Additionally the pouch 9 comprises a slot 91 in order to receive an additional data card 94, which may be inserted and removed as indicated by arrow 92. The additional data card 94 may be a smart card with electrical connectors or RFID interface. However the additional data 94 card may be hooked up to the pouch 9 by some mechanical connector. The additional data card 94 may also be designated as additional token.

A third embodiment may consist of the data card 8 alone without additional interfaces to chip cards or smart cards.

For the sake of simplicity the card 8 as well as the pouch 9 will now be designated as card 8, 9 and the chip card as well as the additional data card will now be designated as additional token 84, 94.

Additionally the card 8, 9 may comprise several interfaces 85, 95. The interfaces 85, 95 may be an optical interface, a radio frequency interface or an electrical interface. However any other interface as know by the person skilled in the art may also be used. The optical interface for example is able to read a flickering code that is provided by a client browser 61. Furthermore it is also possible that the card 8, 9 comprises display means in order to display status and other information to the user. Display means may be LEDs for status information or liquid crystal display for signaling more complex information.

In order to transmit data from the additional token 84, 94 to the card 8 a secure connection using a secure communication channel or encrypted communication channel 40 between the two will be established. This connection will be established at the first time the additional card 84, 94 gets into contact with the token 8. After this first insertion the use of the additional card 84, 94 may be restricted to the token 8,9, depending on the policy of the editor of the additional card.

The card 8 as shown in FIG. 4 contains an internal identity credential management system that contains private keys as identity credentials, the corresponding public keys of the AuSP 63 that uses a specific private key, the public key of the CA 64 that loaded the private keys, enrolment, license access and software update information.

To enable multiple independent relations between operators (provider of services etc.) and users (holder of card) a key management and initialization system is necessary.

The digital identity services work either with the internal identity credentials alone, as provided within the segments 71 and key records 75, with the internal identity credentials and some ad-hoc received information that enters the card 8 through one of the available interfaces preferably optical, radio frequency or electrical contact or with the internal identity credentials, some ad-hoc received information that enters the token through one of the available interfaces and some additional information from the replaceable and customizable additional token 84, 94 that is hooked up to the token.

The additional token 84, 94 may contain information that specifies the nature of the authentication service to provide for a business relationship with the editor or provider of the additional token 84, 94. It may also contain additional identity credentials that may only be used by a specific owner of the card 8. Typically the additional token 84, 94 may be issued by a third party. The additional token 84, 94 may be issued for example by a commercial institute such as a bank, online shop, insurance company. Or the additional token may be issued by a company to its employees in order to gain access to an internal computer system. The additional token may also be a token that has been issued to the user ahead of the cards 8,9.

User 1 of FIG. 7 uses a card 8 or 9. The use of a new service necessitates authentication. Such service may be the first service or may be one of a plurality already existing services. According to the biometrical identification the card 8 is linked directly to the user 1. The provider of the new service now transmits a token 84 to the user 1. This token 84 can be issued from the AuSU, AXS-CA or AXS-PI. It is only important that the service provider trusts the sender of the token 84. The delivery of the token 94 has therefore received the reference numeral 47. The token can be, as suggested by the graphical form in FIG. 7, a smart-card, the chip of a SIM-Card or equivalent or a one-time password or link to access a secure web-page. It is only important, that upon the first use of the token 84 the card 8 starts a secure channel 41 between the card and the AuSU as well as a secure access to the new segment 71 or record 75 to be activated. Of course it is possible, that the token is a smart-card 84 creating itself a secure channel 40 between the card 8 and the smart card 84, but it is also possible that the one-time-token is used inside card 8 without external hardware.

Upon opening of this channel 41 a message payload relating to the new identity is channeled to the card 8 and then either processed and validated through the token 84 or validated directly by the one-time-token as mentioned above. In the end, either a new segment 71 is initialized and/or a new record 75 within a existing segment 71.

In the above described platform identity credentials can be pairs of signed asymmetric keys. The private key of the pair is always enclosed in a safe memory of the entity that uses it to authenticate itself. The corresponding public key is distributed and signed by the CA to all instances that want to identify the owner of the private part of the key. All encrypted messages over the network infrastructure are first encrypted with the public key of the receiver and signed with the private key of the sender. The system may run with different asymmetric encryption schemes: RSA, ECC, ElGamal encryption with appropriate key length known by the person skilled in the art.

The data architecture of the platform foresees a key record for each business relation the card holder has with an application operator (AuSU, 66) that request authentication. The authentication service is provided by the authentication service provider (AuSP, 63) that is either integrated in the IMS of the AuSU 66 or a dedicated external service. The AuSP 63 registers the End-User and activates the corresponding Key Record on the card 8, 9 with the permission of the CA 64 that owns the key storage segment 71 on the card. The AuSP 63 delivers at the same time his identity credential into the card

8 for mutual authentication purposes. After the registration of the card 8 at the AuSP 63 the key record 75 has an activated private key (within 76) as identity credential and (optional) a public key of the AuSP 63 that will be used to authenticate the AuSP 63 server by the card 8. In the case of a pouch 9 some of the key records contains additional fields for the key information for the communication with the connected smart card.

Figure 13:
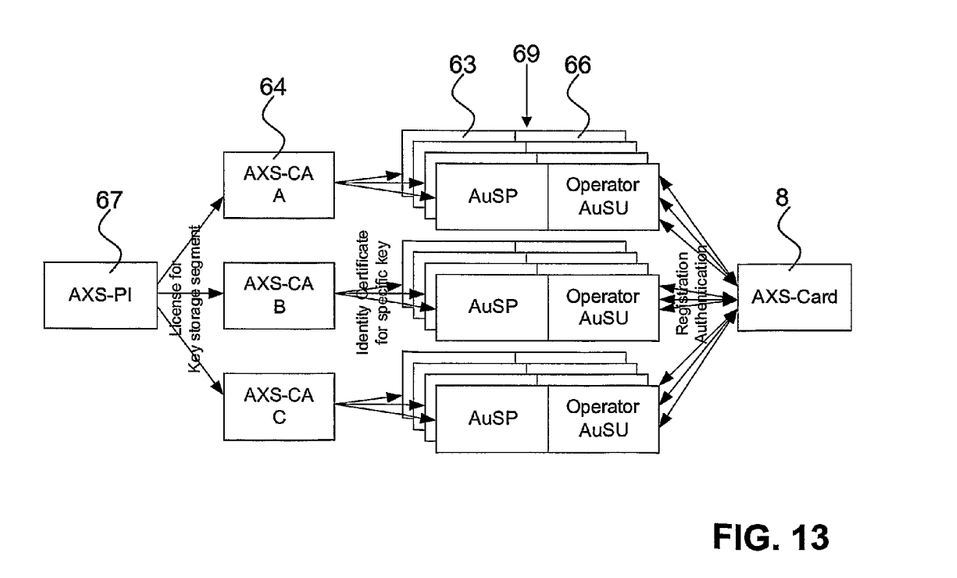
FIG. 13 shows a federated operation.

As shown in FIG. 13, a card 8 is issued by the producer of the card (AXS-PI, 67). Each card 8, 9 may be used by several independent CA 64, each CA 64 using one segment 71 of the card 8 having received a license for such use. Each CA 64 may store a set of identity credentials (initialized key records) 75 on the card 8 upon request of the EndUser. The identity credentials of one CA 64 are all stored in an own allocated segment 71 with a certain number of key records 75 that may be activated at a given time by the CA 64 or an AuSP 63 affiliated to the CA 64. The card issuing CA 64 delivers the card 8 with the first segment 71 initialised. It also cares about the first enrolment of the user with the card 8 The CA 64 that initialises a further key storage segment 71 afterwards may request the run of a new enrolment protocol or may accept the enrolment of the card issuing CA 64. The corresponding information (personal enrolment code called FingerCode for the segment 71 and the corresponding fingerprint mapping) is stored inside the segment 71 together with the certificate of the CA (public key). The initialization by a further CA may also happen after the issuing of the card to the user. It is sufficient that the necessary access codes are predefined just after the firmware loading 102 (AXS-PI) into the card.

Each key record contains additional handling information which defines the used key length, the cryptographic algorithm and the treatment of the message data. The access to the segments 71 and to each key 75 inside is under the sole control of the corresponding CA 64. But for the initialization of the segment and the key records the CA 64 has to obtain a segment access (SAC) and key record access (KAC) codes which are delivered by the card producer AXS-PI 67. For each activated key record an expiration data (KED) is defined. The KED is set at the time of the activation of the key record (registration of the card 8 at an AuSP 63). The key record is active until the latest date in the Event and Time Log record is newer than the KED. After that respectively at the next use of the key record credential the KED must be refreshed to a new date. This refreshment request a key renewal code (KRC) that is also delivered by the card producer. These unlock and renewal mechanisms allow a periodic license activation for all identity credentials in use. A similar mechanism allows to revoke a single credential within one card without affecting the usability of the card and the other credentials on the card.

The control and metadata parameters allow to realize with the same card 8 completely different use cases and business models without altering the basic firmware.

A method for setting up such a card 8 and an additional token 84 as described above is illustrated in FIGS. 4 and 5 and described as follows.

The production of the card 8, 9 comprises the following steps:
hardware production 100, wherein the card 8 or the pouch 9 will be manufactured.
Load firmware 101. The firmware will be loaded on the card.
The hardware as well as the firmware will be tested.
If all the tests were successful, the card 8, 9 is designated as "Anonymous Card" and is then ready to load the different identifier, credentials and codes.
The following steps individualize the anonymous card:
Load card initialization activation and renewal codes 102.

The initialization instance enters an identifier map into the identity credential database and initializes the card 8, 9 with the identifiers (IDT, IDS, IDX) and the licence control codes (SAC, KAC, KRC) and sets on each record the key expiration data (KED). After this step the hardware and firmware is only accessible through the standard communication channels (e.g. RFID, optical interface, etc.).

After the production and initialization step the individualized cards 8, 9 are shipped to the CA 64. The CA 64 runs on each card 8, 9 the following key loading protocol:
Loading the CA public key (PubCA) for the specific lot PubCA into the segment opened by the SAC-code 103, 104.
Initializing the Key records of the segment with the PrivKey IDX, the key activation code (KAC) and the command controls that define the operations on the messages
After that the following steps will be applied:
User enrollment with the registration of the biometric reference templates in the card 105

The CA 64 initializes the card with digital cryptographic identity credentials and produces the corresponding certificates. It delivers them (cards and optionally the certificates) to affiliated enrolment centres (EC). Each certificate contains information on the security level that has been applied for the enrolment process by the issuing CA 64 respectively its EC. There are three enrolment environments with different security levels and with inversely proportional ease of deployment:

As a $1^{st}$ level enrolment security a distribution model applies. Enrolment may be at any place after the card and a special enrolment enabling code has been sent to the user through a secure channel (standard security level, e.g. applied with credit card distribution). The card is shipped to the end-user by an unsecured but reliable distribution channel (ground mail, HR offices within an organisation etc). In parallel an enrolment code is shipped to the end-user over a secure channel (e.g. certified Mail). With the enrolment code the end-user can run an enrolment protocol at any computer connected to the Internet. The enrolment protocol is provided by the authentication server of the CA.

As a $2^{nd}$ level enrolment security a trusted tree model applies. Enrolment in the presence of a trusted and already enrolled person that is entitled to enroll new users (enhanced security level). The new end-user gets his card 8, 9 from an agent who knows him personally and who owns already an enrolled card. The new end-user gets the corresponding enrolment code on a same secure channel than in the distributed model. To run the enrolment protocol for the new card 8, 9 the agent has to start it at any internet connected computer with his card 8, 9. Then the new user runs the standard enrolment process from the same computer terminal. The agent knows the new user and thus guarantees that only the right person gets enrolled. He acts as a temporary mobile EC.

As a $3^{rd}$ level enrolment security a certified authentication model applies. Enrolment inside a trusted site (EC) under human supervision with a presentation of an official identity pass (high security level). The CA mandates and certifies specific sites in a protected environment to be an enrolment centre (EC). A new End-User receives the card 8, 9 in the EC after a verification of his identity through an EC-officer (e.g. presentation of a governmental issued passport). The new End-User then runs the enrolment protocol at a dedicated terminal in the EC. The enrolment code is provided by the EC-officer.

A user 1 that later wants an upgrade of the security level of his card 8, 9 has to go through a new enrolment process or a verification of his enrolment that is compatible with the aimed security level. The initialization and enrolment process of the CA and the EC may be certified according recognized certification standards (CC, IPSEC, FIPS) to guarantee mutual trust if more than one CA issues cards and certificates. The enrolment process is the same for all three security levels. It establishes a strong 2- or 3-factor link between the user as a person and the card 8, 9. After a proper enrolment each certificate represents an independent certified digital identity credential for the User's identity.

In all authentication systems the enrolment is a critical step that includes a priori knowledge and certitudes on the identity of a person 1. In most cases the initial identity information comes from a governmental IMS. The registration and management of the identities of their citizens is one of the most important tasks of any state. All IMS have to bootstrap on some sort of official government issued credentials.

After completion of the enrolment protocol the enrolment security level is written into the card 8, 9 and may be queried in further registration or authentication processes.

After the enrollment the card is ready to be used. For this the user (enrolled card holder) makes the following two operations:

Registration at the AuSP 106 at the first access to a new site or service

Authentication as often as the user needs to proof his identity to access restricted sites or services 107.

After the above mentioned steps, the card 8, 9 is an operative card 8, 9 for the use with AuSP 66. However if the credential expires, they may be unlocked with a key renewal code 108. If the code is valid, the card will be unlocked. If the code is invalid the specific key on the card will be blocked.

Additionally if the pouch 9 is used in combination with the additional token 94, an initialization 110 of the pouch 9 and the additional token 94 is necessary.

The pouch 9 option allows an a posteriori customization of the additional token 94 functionality. The specific response to a message payload is processed in the additional token 94 which may be a smart card or another removable token that can be hooked to the card. The pouch 9 (card with a mechanical slot 91 to hold a smart card) serves as a authenticating device that transmits the decrypted message to the SMC over a secure channel 40 between the pouch and the SMC. This secure channel 40 is established the first time the additional token 94 is introduced into the pouch 9 through a symmetric mechanism. After this initialization the additional token 94 can only communicate with the initial pouch 9. All other communication channels to other devices (card readers) are not altered by this initialization operation. The same is true, if the message payload is processed with the help of the additional one-time-software-token to initialize a given segment 71 or record 75.

The card 8, 9 may be registered at AuSP/AuSU. When the user enters into a business relation with an operator (AuSU/AuSP) the next available certificate of the user's card 8,9 has to be delivered to the authentication server of the operator. This certificate is then allocated solely for the authentication of the user in this specific operator network. The authentication server may be part of the IMS of the operator himself or may be operated by an external Authentication Service Provider (AuSP).

In the network registration the card 8,9 is registered in an IMS of an Authentication Service Provider (AuSP). The card 8, 9 registration activates the next unused key in the list of the initially stored keys (IDX). The message also contains the CA-signed PubKey of the AuSP. This allows then mutual authentication between server and card 8,9.

The key renewal section in each key record is a license control field. It contains the key renewal code (KRC) that blocks the access to this field for non legitimates messages. In the field is also key expiration code, which defines the validity date of the actual record. After passing the validity date, a new key renewal code (send by the authorized instance) has to be stored in the record and the KED has to be set to the new expiration date.

For all edited cards 8, 9, the provider maintains a credential management system. This system delivers the necessary codes to store, initialize and operate the identity credentials in the card. It will also allow reproducing in collaboration with the involved CA lost or stolen cards without excessive user interaction (only the reenrollment of the user is necessary).

With reference to FIG. 7, no trusted network of operators is necessary to realize identity federation. Many different mutual trusting or non-trusting organizations may use the same card 8,9 to authenticate its owner. The only restriction is that the organizations must assure or belief that the card is really in the hand of the alleged user. This can be done by an enrolment check. Every operator can do such a check at any time over the Internet (see enrolment protocol). Normally it is sufficient that the operator gets access to a specific credential inside the card 8,9 from the editing CA. The CA then guarantees at a specified security level that the identified card 8,9 is in the sole possession of the legitimate owner. A new business relation is then very easy to start. The user just registers his personal card 8,9 in the IMS of the operator. The operator gets the access code for one of the pre-initialized identity credential stored in the card 8, 9 and establishes an authentic one-to-one relation with this user based on the specific allocated identity credential. This scheme realizes an unlimited identity federation across all operators that accept the authentication.

Thereby the card 8, 9 uses the same identity credentials for logical as well as physical access. The separation between logical and physical access systems comes partly from the fact that two different communication concepts are used. For physical access we often use an integrated circuit card (smart cards) that holds an identity credential which we have to present (contact or contactless) to a reader at the entry gate. For logical access we often have to submit a secret code over a keyboard in the authentication process.

With the device and method according to the present invention these two forms of authentication are integrated in the same scheme. The same identity credentials are used to deliver the requested identity proofs over appropriate communication channels. The card 8, 9 generates the proof (OTP) and delivers it over the internal LCD-screen for the logical access infrastructure. For physical access the same identity credential delivers the identity proof over the built-in RFID communication channel (ISO 14443 Standard) to the reader at the gate. This means that the unification of logical and physical access can be done with minimal changes on the existing infrastructure.

ISO uses the term "Integrated Circuit Card" (ICC) to encompass all those devices where an integrated circuit is contained within an ISO 1 identification card piece of plastic of the standard size of a credit card (commonly named smart card). Integrated Circuit Cards come in two forms, contact and contactless. Smart card technology is used increasingly in applications that must protect personal information or deliver fast, secure transactions.

The card 8, 9 according to the present invention is able to make smart cards accessible at any place. Thereby new applications for business purposes will be created. The use of Smart Cards depends on the availability of a local reader which restricts the mobility and the application fields of the cards. The card, 8, 9 is designed to establish a secure connection to smart cards and to serve to some extend as personal mobile reader. With the card 8, 9 solution new services may be hooked up to the authentication system even after the roll out. The operator just sends smart card customized for his new service to the users who can access the new service inserting the smart card or additional token 94 into card 8, 9.

Instead of a smart card with the standard size only the smart card connection field (chip and connector (like a SIM card) may be used as plug-in into the card 8. This would allow a simplified solution for the pouch concept as described above.

The authentication device and method according to the present invention is flexible to serve different operation models according the authentication needs of the operator or the operator community. This will be illustrated by means of FIGS. 10 to 13.

Figure 10:
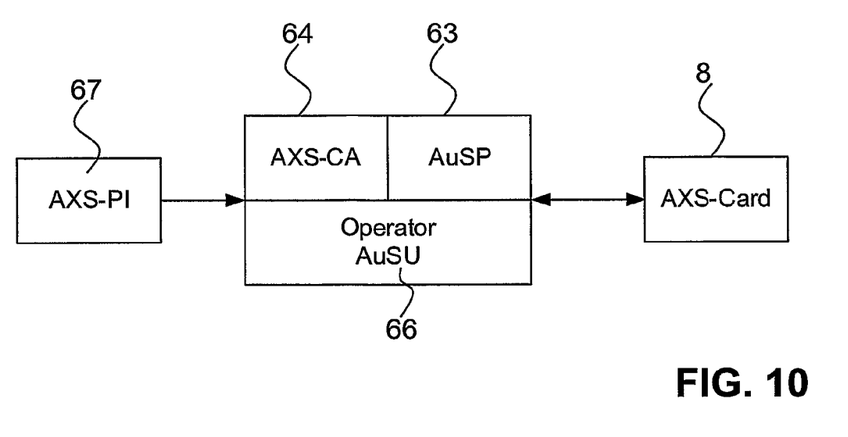
FIG. 10 shows a stand alone operation mode.

FIG. 10 shows the present invention in a stand-alone operation. In this operation one organization combines the roles of the CA, the EC, the AuSP and the AuSU. The organization runs an own IMS using the authentication to control physical and logical access of authorized users to the assets of the organization. It gets the card 8 and the license codes from the producer 67 and distributes it to its users.

Figure 11:
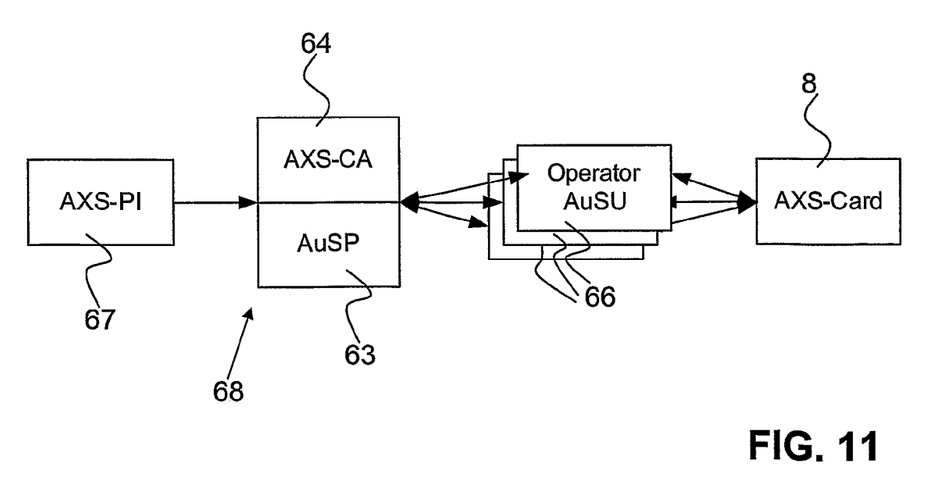
FIG. 11 shows a authentication service operation.

FIG. 11 shows the present invention in an authentication service operation. In the authentication service operation model an organization 68 delivers to several organizations 66 the service of identity management and identity credential verification. The main application of such service is the authentication of online users for business platform operators. The authentication service provider 68 combines the roles of the CA, the EC and the AuSP. It distributes the cards and manages the identity credentials for the different operators that have a business relation with the EndUser of a card. The AuSP may run a specific Web-based portal to bundle all provided accesses.

Figure 12:
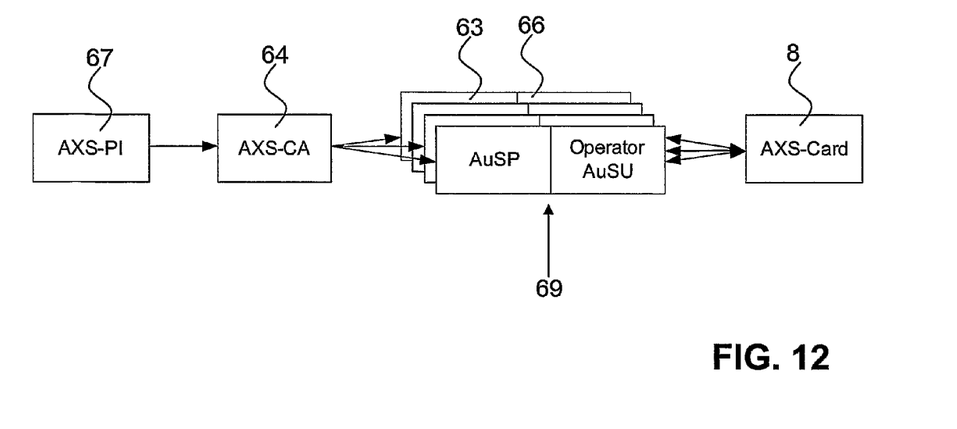
FIG. 12 shows a certification authority operation.

FIG. 12 shows the present invention in a certification authority operation. In this operation model an already established and recognized public or private organization takes the role of a CA 64. It runs EC and provides other organizations 69 (AuSP+AuSU) with certified public keys of the cards, so that these organizations can verify the identity of the End Users whenever they get in business relation with the AuSU FIG. 13 shows the present invention in a federated operation. In this model several CA 64 may initialize cards 8 with their certified key as identity credentials. Each card 8 may contain several independent identity credential segments 71 each one allocated to a different CA 64. Each CA 64 then operates for his client organization 69 as an independent CA 64 for the credential segment on the card 8 that has been certified by the specific CA 4. Each CA 64 has to purchase a segment activation Code that allows it to store his credentials on a specific card segment 71. This subsequent loading of keys to a card 8 by a CA 64 does not interfere with the previously loaded credentials of other CA's 64. Each CA 64 may request an enrolment verification from the End User according her security policy.

In a special privacy enhancing technology embodiment a CA delivers to the end user the signed certificates for the loaded credentials. The end-user then delivers at a registration process the corresponding certificate to the AuSP. The AuSP can the verify the certificate without asking the CA and the those is not able to track the business relations of a user nor can the AuSP verify further personal information than the ones delivered with the certificate. This scheme allows establishing the concept of a trusted and certified pseudonym which may be different for each AuSP. This protects the user from profiling attacks and allows him to keep maximal anonymity in online transactions.

The authentication system can run all above described operation models without any modification of the card 8 or the authentication platform. For this, a proprietary data architecture for the virtual storage and the management of the identity credentials has been developed as outlined above.

The invention claimed is:

1. A security token comprising:
a personal data memory configured to store digital identity credentials related to personal data and personalized data of a user;
an input appliance configured to check said personal data and personalized data; a key record data memory configured to store at least one identity credential of an authentication server or of an application operator, the key record data memory being adapted to store a plurality of key records, wherein each key record stored in the key record data memory comprises the personalized data and the identity credential;
a transmitter and receiver hardware unit configured to create a secure channel directly or indirectly to said authentication server or application operator to handle said key record relating to said authentication server or application operator, respectively; and
a control unit configured to control the transmitter and receiver hardware unit and the key record data memory in view of said handling, wherein the control unit is configured to perform one of:
interpreting, deciphering, creating, checking, renewing, withdrawing and further key record handling actions,
wherein the control unit comprises record activation elements enabling one certification authority or authentication server to handle all key records to distribute authorizations to handle different key records to different authentication servers or application operators, respectively.

2. The security token according to claim 1, wherein the input appliance comprises an on-board identity verification using two or three authentication factors.

3. The security token according to claim 1, wherein the key record data memory is configured to store a plurality of identity credentials initialized by a certification authority, acting as said authentication server.

4. The security token according to claim 1, wherein the content of an additional token is input to the control unit to perform an identity check upon creating or activating a new key record or using an activated key record with a new payload instruction.

5. The security token according to claim 4, comprising an electronic circuit element as the additional token comprising an additional transmitter and receiver hardware unit configured to create an additional secure channel to said security token to receive a message payload from the authentication server or application operator, and a processing unit configured to forward a processed message to said control unit.

6. The security token according to claim 4, wherein the additional token used as input to control the control unit is secret data.

7. The security token according to claim 1, further comprising two or more key segments comprising at least one each of the plurality of key records, wherein the control unit comprises segment activation elements configured one certification authority to handle all key records of one key segment and to distribute authorizations to handle different key records to different authentication servers or application operators.

8. The security token according to claim 1, wherein the personal data memory and the input appliance is configured to store and check biometric data as personal data or secret data as personal data of the user.

* * * * *